US008379555B2

(12) United States Patent
Tang et al.

(10) Patent No.: US 8,379,555 B2
(45) Date of Patent: Feb. 19, 2013

(54) METHOD AND APPARATUS OF AWAKING A COMMUNICATION DEVICE

(75) Inventors: Sung-Chien Tang, Taoyuan County (TW); Hsin-Yi Lee, Hsinchu County (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 411 days.

(21) Appl. No.: 12/478,762

(22) Filed: Jun. 4, 2009

(65) Prior Publication Data

US 2010/0165898 A1 Jul. 1, 2010

(30) Foreign Application Priority Data

Dec. 30, 2008 (TW) .............................. 97151371 A

(51) Int. Cl.
*H04W 52/02* (2009.01)
(52) U.S. Cl. ......................... 370/311; 455/574
(58) Field of Classification Search .................. None
See application file for complete search history.

(56) References Cited

U.S. PATENT DOCUMENTS

| 5,881,101 | A  | * | 3/1999 | Furman et al. ............... 375/217 |
| 7,319,867 | B2 |   | 1/2008 | Li |
| 2003/0114204 | A1 | * | 6/2003 | Allen et al. ................... 455/574 |
| 2005/0059386 | A1 | * | 3/2005 | Li .................................. 455/420 |
| 2007/0070998 | A1 |   | 3/2007 | Sethuram |
| 2007/0077960 | A1 | * | 4/2007 | Jain et al. ................... 455/550.1 |
| 2008/0176548 | A1 | * | 7/2008 | Liang ............................ 455/419 |
| 2009/0017810 | A1 | * | 1/2009 | Harsch .......................... 455/418 |
| 2009/0186620 | A1 | * | 7/2009 | Yu et al. ........................ 455/445 |
| 2009/0193109 | A1 | * | 7/2009 | Kuo et al. ..................... 709/223 |
| 2009/0205038 | A1 | * | 8/2009 | Kumar et al. ................... 726/11 |
| 2010/0039971 | A1 | * | 2/2010 | Lor et al. ...................... 370/311 |
| 2010/0067422 | A1 | * | 3/2010 | Kadous et al. ................ 370/311 |
| 2010/0069127 | A1 | * | 3/2010 | Fiennes ......................... 455/574 |
| 2011/0235691 | A1 | * | 9/2011 | Greszczuk et al. ........... 375/219 |

* cited by examiner

*Primary Examiner* — Min Jung

(74) *Attorney, Agent, or Firm* — Winston Hsu; Scott Margo

(57) ABSTRACT

A method of awaking a communication device operating in a sleep mode for a wireless network interface card includes continuously sending a plurality of coupling packets to maintain coupling between the communication device and a remote communication device, receiving a wireless packet from the remote communication device, determining a packet type of the wireless packet according to a packet format corresponding to a wake-up packet, and controlling the communication device to leave the sleep mode when the wireless packet is determined to be the wake-up packet.

16 Claims, 3 Drawing Sheets

METHOD AND APPARATUS OF AWAKING A COMMUNICATION DEVICE

BACKGROUND OF THE INVENTION

1. Field of the Invention

The present invention relates to a remote control method and related device, and more particularly, to a method of performing remote awaking through wireless communication and related device.

2. Description of the Prior Art

A wireless communication system usually includes multiple access point devices, each of which wirelessly communicates with one or more user devices, such as a mobile phone, a laptop, and other mobile devices. The user devices include a wireless network interface card (WNIC) for dealing with wireless signals, such as frequency scanning, wireless packet detection and transmission, from the access point devices.

Generally, the user devices are cable of performing power management and include at least a normal mode and a sleep mode (or a power saving mode). In the normal mode, all of hardware and software devices in the user device work normally and provide all of needed hardware and software functions. In the sleep mode, the user device disables most of hardware and software devices for power saving purpose.

Remote control is a function allowing a user to control a local device through a wired/wireless network, by using a remote control device. The remote control usually includes a wake-up operation which allows the user to wake up a communication device at a terminal B by operating a communication device at a terminal A. To awake the communication device at the terminal B, the software of the communication device at the terminal A has to transmit a packet corresponding to a wake-up packet format, to the access point device to which the communication device at the terminal B belongs through a wired or a wireless network. The access point device continuously sends beacons. Accordingly, the communication device at the terminal B sends a specific packet to the access point device when it enters the sleep mode, to maintain coupling with the access point device. To put it in another way, by beacons and the packets sent back from the communication device at the terminal B, the access point device can perceive that the communication device at the terminal B still exists in the wireless network. When the access point device finds the communication device at the terminal B, the access point device immediately sends the wake-up packet to awake the communication device at the terminal B.

According to the prior art, the access point device must actively inquire the status of the communication device at the terminal B and passively wait for the response from the communication device at the terminal B to be informed about the existence status of the communication device at the terminal B. This, however, imposes large workload on the access point device and therefore causes the procrastination of the wake-up process.

SUMMARY OF THE INVENTION

Therefore, the present invention provides a method of awaking a communication device for a wireless network interface card and related device.

The present invention discloses a method of awaking a communication device operating in a sleep mode. The communication device can be a wireless network interface card acting as a wireless communication interface between the communication device and a remote communication device The method includes continuously sending the remote communication device a plurality of coupling packets to maintain coupling between the communication device and the remote communication device, receiving a wireless packet from the remote communication device, determining a packet type of the wireless packet according to a packet format corresponding to a wake-up packet, and controlling the communication device to leave the sleep mode when the wireless packet is determined to be the wake-up packet.

The present invention further discloses a wireless network interface card of a communication device in a sleep mode. The wireless network interface card includes a transceiver, a coupling maintenance unit, a packet reception unit, storage unit, a determining unit, and a wake-up unit. The transceiver is used for transmitting wireless signals corresponding to a plurality of coupling packets and receiving wireless signals corresponding to a wireless packet sent by the remote communication device. The packet reception unit is coupled to the transceiver, and used for receiving the wireless packet. The storage unit is used for storing a packet format corresponding to a wake-up packet. The determining unit is coupled to the packet reception unit, and used for determining whether the wireless packet corresponding to a wake-up packet and generating a control signal when the wireless packet is determined to be a wake-up packet. The wake-up unit is coupled to the determining unit, and used for controlling the communication device to leave the sleep mode according to the control signal.

The present invention further discloses a method of awaking a communication device comprising a wireless network interface card. The communication device at least includes one sleep mode and one non-sleep mode. The method includes in the sleep mode, continuously sending a plurality of coupling packets to a remote communication device by the wireless network interface card, receiving a wireless packet from the remote communication device, determining whether the wireless packet corresponds to a packet type of a wake-up packet, and controlling the communication device to leave the sleep mode when the wireless packet corresponds to the wake-up packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
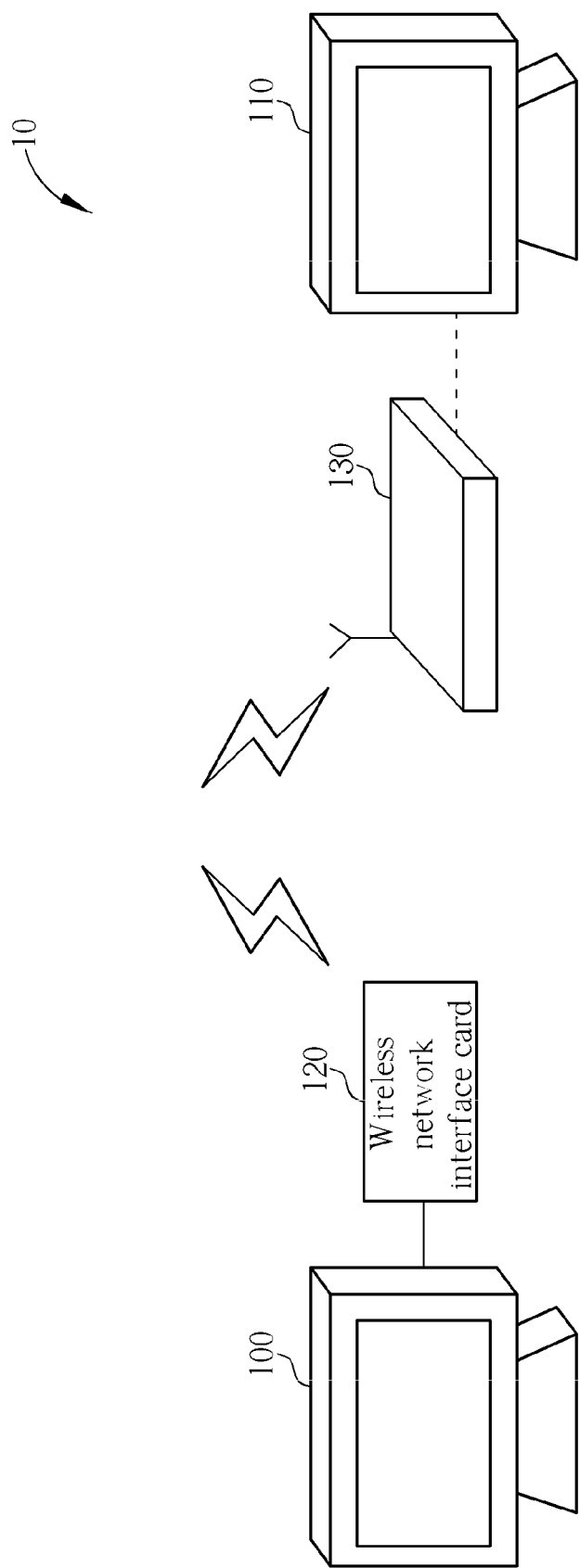
FIG. 1 is a schematic diagram of a wireless network system according to an embodiment of the present invention.

Please refer to FIG. 1, which is a schematic diagram of a wireless network system 10 according to an embodiment of the present invention. The wireless network system includes communication devices 100 and 110, a wireless network interface card 120, and an access point device 130. The communication devices 100 and 110 can be a desktop, a mobile phone or a laptop. The communication device 110 is coupled to the access point device 130 via a wired or wireless and swaps wireless packets with the wireless network interface card 120 to transmit data or control signals between the communication devices 100 and 110. The wireless network interface card 120 sends identification information of the communication device 100, such as a device name and a media access control (MAC) address of the communication device 100, in the wireless network system 10. The communication device 100 can be operated in, at least, a sleep and a non-sleep mode. The non-sleep mode can be a normal mode where the communication device 100 loads all of necessary drivers and is powered through a main power. In the sleep mode, the communication device 100 loads only drivers for a few devices (the wireless network interface card 120 included) and shuts down the main power. Instead, an auxiliary power takes over power supplies for the devices activated in the sleep mode for power saving purpose.

Figure 2:
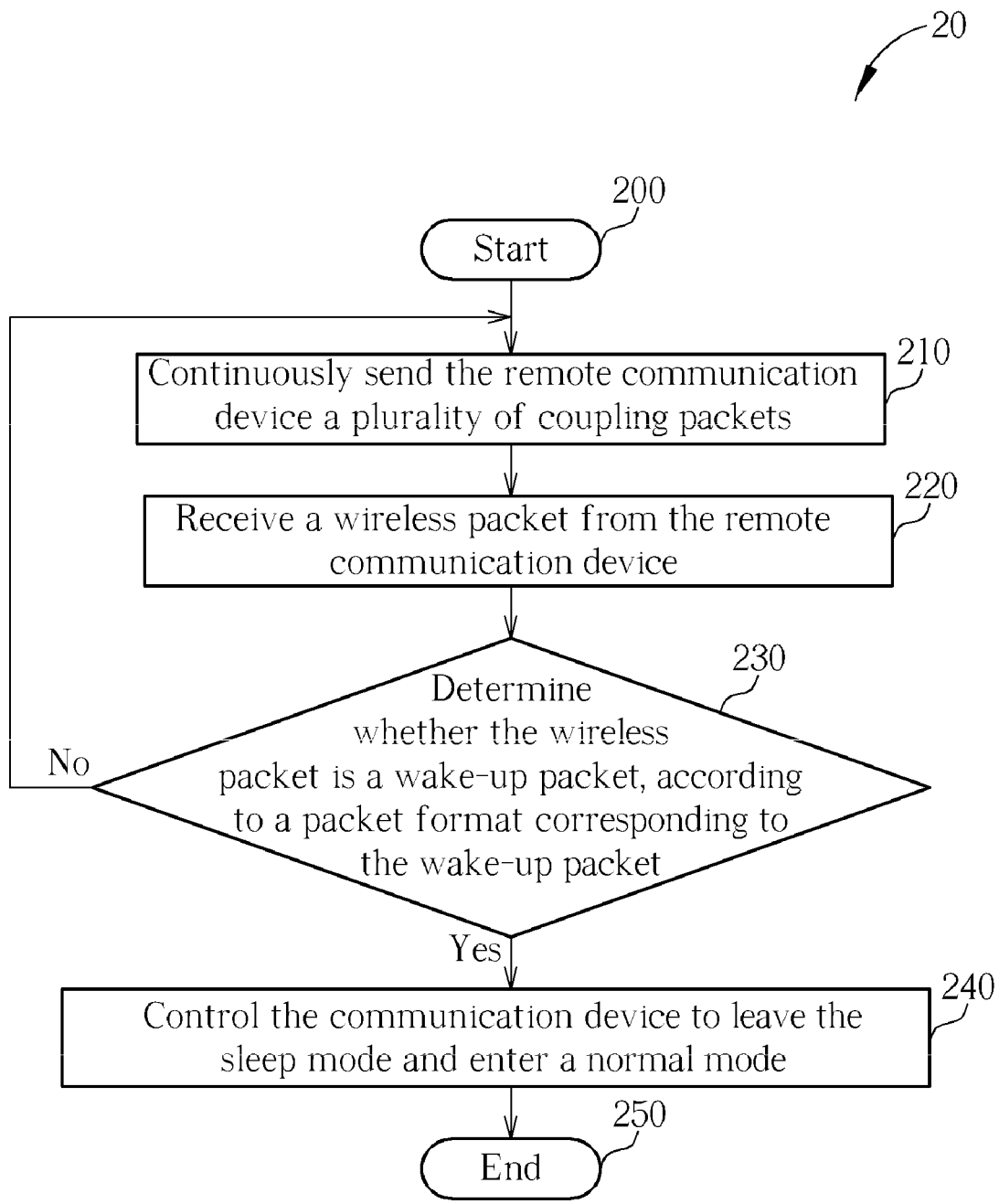
FIG. 2 is a flowchart of a wake-up process according to an embodiment of the present invention.

Please refer to FIG. 2, which is a flowchart of a wake-up process 20 according to an embodiment of the present invention. The wake-up process 20 is applied to a wireless network interface card. The primary goal of the wake-up process 20 is to awake a communication device operating in a sleep mode for a wireless network interface card. The wireless network interface card is an interface between the communication device and a remote communication device. The wake-up process 20 includes the following steps:

Step 200: Start.

Step 210: Continuously send the remote communication device a plurality of coupling packets.

Step 220: Receive a wireless packet from the remote communication device.

Step 230: Determine whether the wireless packet is a wake-up packet, according to a packet format corresponding to the wake-up packet. If so, go to Step 240. Otherwise, go back to Step 210.

Step 240: Control the communication device to leave the sleep mode and enter a normal mode.

Step 250: End.

According to the wake-up process 20, the wireless network interface card continuously sends the plurality of coupling packets to the remote communication device to maintain a wireless coupling between the communication device and the remote communication device when the communication device enters the sleep mode. In other words, the coupling packets are used for informing the remote communication device about the status which indicates that the communication device is still active in the wireless network. Meanwhile, the wireless network interface card detects the wireless signals by frequency scanning and receives the wireless packet from the remote communication device. When receiving the wireless packet, the wireless network interface card determines whether the wireless packet is a wake-up packet, according to the packet format corresponding to the wake-up packet. If so, the wireless network interface card controls the communication device to leave the sleep mode and to enter the normal mode. Otherwise, the wireless network interface card continuously sends the plurality of coupling packets and performs the wireless packet reception.

Preferably, the coupling packet is a null frame packet including none of data but header information. Apart from that, the wake-up packet is a magic packet whose exemplary format includes "FF" of six bytes, followed by sixteen MAC addresses of the communication device. In this situation, when a received wireless packet includes the aforementioned format content, the wireless packet is determined to be the wake-up packet.

Please note that those skilled in the art are able to change the packet format, corresponding to the wake-up packet, based on system and resource requirements. For example, the packet format corresponding to the wake-up packet can be a basic service set identifier (BSSID) or other header information as well.

The wake-up process 20 can be applied to the wireless network interface card 120 shown in FIG. 1. In this situation, the wireless network interface card 120 sends the plurality of coupling packets to the access point device 130 to maintain a wireless coupling between the communication device 100 and the access point device 130 when the communication device 100 is operated in the sleep mode. When the communication device 110 attempts to awake the communication device 100, software of the communication device 110 generates a packet, conforming to the wake-up packet format, and sends the packet to the access point device 130 through a wired or wireless. After this, the access point device 130 sends a wireless packet conforming to the wake-up packet format to the wireless network interface card 120. After receiving the wireless packet, the wireless network interface card 120 determines that the wireless packet is the wake-up packet, and controls the communication device 100 to switch from the sleep mode to the normal mode. When the communication device 100 enters the normal mode, the inner operation system is waked up and begins to load the necessary drivers.

As known above, the wireless network interface card actively and continuously sends the coupling packets by use of the wake-up process 20, to inform the remote communication device (i.e. the access point device 130) about the existence of the wireless coupling, so as to loosen the workload for the remote communication device.

Figure 3:
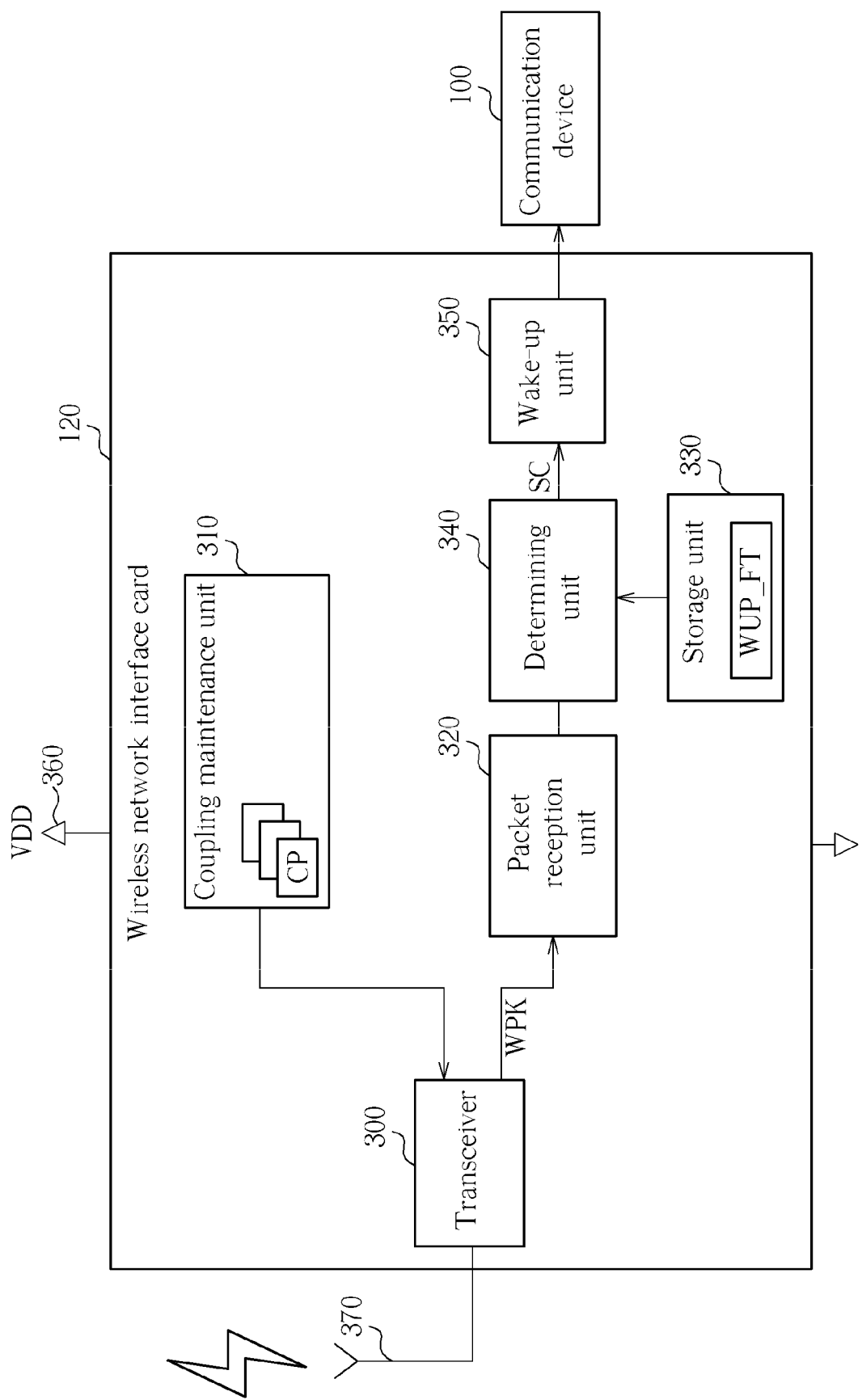
FIG. 3 is a schematic diagram of the wireless network interface card shown in FIG. 1.

Please refer to FIG. 3, which is a schematic diagram of the wireless network interface card 120 shown in FIG. 1. The wireless network interface card 120 is used for awaking the communication device 100 and includes a transceiver 300, a coupling maintenance unit 310, a packet reception unit 320, a storage unit 330, a determining unit 340, a wake-up unit 350, a driving voltage reception terminal 360 and an antenna 370. In the sleep mode, the communication device 100 uses an auxiliary power to provide an operating voltage VDD for the driving voltage reception terminal 360. By use of the antenna 370, the transceiver 300 emits wireless signals related to a plurality of coupling packets CP, and receives wireless signals related to a wireless packet WPK, where the wireless packet WPK is sent by the access point device 130, and comes from a remote communication device (i.e. the communication device 110). The coupling maintenance unit 310 is used for continuously generating the plurality of coupling packets CP to maintain the coupling between the communication device 100 and the access point device 130. The packet reception unit 320 is used for receiving data content of the wireless packet WPK. The storage unit 330 is used for storing a packet format WUP_FT corresponding to a wake-up packet. The determining unit 340 is used for determining a packet type of the wireless packet WPK according to the packet format WUP_FT and generating a control signal SC when the wireless packet WPK is determined to be the wake-up packet. According to the control signal SC, the wake-up unit 350 controls the communication device 100 to leave the sleep mode and enter the normal mode. In the normal mode, the communication device 100 uses the main power to provide the operating voltage VDD for the driving voltage reception terminal 360. The wireless network interface card 120 can realize the wake-up process 20. Thus, detailed descriptions are not narrated herein.

According to the prior art, the access point device continuously sends beacons to the nearby communication device. Meanwhile, the wireless network interface card of the communication device passively responds to the access point device to inform the self-existence. Instead, the wireless network interface card actively in accordance with the present invention sends the coupling packets to maintain the coupling with the access point device. Therefore, the remote communication device, i.e. the access point device, realizes the existence of the wireless network interface, and does not make the disassociation between the remote communication device and the wireless network interface. Thus, when the remote communication device attempts to take awaking actions, the remote communication device can perceive the existence of the awaking target immediately, without waiting. Consequently, the embodiments of the present invention are able to loosen the workload for the remote communication device and further speed up the wake-up process.

Those skilled in the art will readily observe that numerous modifications and alterations of the device and method may be made while retaining the teachings of the invention.

What is claimed is:

1. A method of awaking a communication device operating in a sleep mode, comprising:
   wireless network interface card coupled to the communication device actively and continuously sending a remote communication device a plurality of coupling packets to maintain coupling between the communication device and the remote communication device;
   receiving a wireless packet from the remote communication device;
   determining whether the wireless packet is a wake-up packet; and
   controlling the communication device to leave the sleep mode when the wireless packet is determined to be the wake-up packet.

2. The method of claim 1, wherein the plurality of coupling packets are null frame packets.

3. The method of claim 1, wherein the wake-up packet is a magic packet.

4. The method of claim 1, wherein the remote communication device is an access point device.

5. The method of claim 1, wherein controlling the communication device to leave the sleep mode comprises switching a power supply of the communication device from an auxiliary power to a main power.

6. A wireless network interface card of a communication device in a sleep mode, comprising:
   a transceiver for actively and continuously transmitting wireless signals corresponding to a plurality of coupling packets to a remote communication device to maintain coupling between the communication device and the remote communication device and receiving a wireless signal corresponding to a wireless packet sent by the remote communication device;
   a packet reception unit coupled to the transceiver, for receiving the wireless packet;
   a determining unit coupled to the packet reception unit, for determining whether the wireless packet corresponds to a wake-up packet and generating a control signal when the wireless packet is determined to be a wake-up packet; and
   a wake-up unit coupled to the determining unit, for controlling the communication device to leave the sleep mode according to the control signal.

7. The wireless network interface card of claim 6, wherein the plurality of coupling packets are null frame packets.

8. The wireless network interface card of claim 6, wherein the wake-up packet is a magic packet.

9. The wireless network interface card of claim 6, wherein the remote communication device is an access point device.

10. A method of awaking a communication device comprising a wireless network interface card, the communication device at least comprising one sleep mode and one non-sleep mode, the method comprising:
    in the sleep mode, actively and continuously sending a plurality of coupling packets to a remote communication device by the wireless network interface card;
    receiving a wireless packet from the remote communication device;
    determining whether the wireless packet corresponds to a packet type of a wake-up packet; and
    controlling the communication device to leave the sleep mode when the wireless packet corresponds to the wake-up packet.

11. The method of claim 10, wherein the plurality of coupling packets are null frame packets.

12. The method of claim 10, wherein the wake-up packet is a magic packet.

13. The method of claim 10, wherein the remote communication device is an access point device.

14. The method of claim 10, wherein the communication device loads at least a driver of the wireless network interface card and switches to an auxiliary power.

15. The method of claim 10, wherein the non-sleep mode is a normal mode in which the communication device is powered through a main power.

16. The method of claim 10, wherein a step of controlling the communication device to leave the sleep mode comprises switching a power supply of the communication device from an auxiliary power to a main power.

* * * * *